United States Patent [19]
Naoumidis et al.

[11] Patent Number: 6,048,636
[45] Date of Patent: Apr. 11, 2000

[54] ELECTRODE SUBSTRATE FOR FUEL CELL

[75] Inventors: Aristides Naoumidis; Frank Tietz, both of Jülich; Detlev Stöver, Niederzier, all of Germany

[73] Assignee: Kernforschungszentrum Jülich GmbH, Jülich, Germany

[21] Appl. No.: 09/105,116

[22] Filed: Jun. 17, 1998

Related U.S. Application Data

[63] Continuation-in-part of application No. PCT/DE96/02424, Dec. 13, 1996.

[30] Foreign Application Priority Data

Dec. 20, 1995 [DE] Germany .......................... 195 47 700

[51] Int. Cl.$^7$ .................................................. H01M 4/86
[52] U.S. Cl. ............................................... 429/44; 429/40
[58] Field of Search .................... 429/40, 44, 152, 429/158, 160, 161, 38, 39, 30, 33

[56] References Cited

U.S. PATENT DOCUMENTS

| | | | |
|---|---|---|---|
| 5,470,672 | 11/1995 | Naoumidis | 429/40 |
| 5,496,655 | 3/1996 | Lessing | 429/44 |
| 5,824,429 | 10/1998 | Das et al. | 429/44 |
| 5,885,729 | 5/1999 | Marchetti | 429/44 |
| 5,908,713 | 6/1999 | Ruka et al. | 429/44 |

*Primary Examiner*—Bruce F. Bell
*Attorney, Agent, or Firm*—Klaus J. Bach

[57] ABSTRACT

In an electrode for a fuel cell which has a porous self-supporting layer and another layer with catalytic properties disposed on said self-supporting layer, the self-supporting layer has a thickness several times greater than that of the layer with the catalytic properties and consists of a cermet comprising $Al_2O_3$ or $TiO_2$ to which Ni is admixed.

4 Claims, 1 Drawing Sheet

ELECTRODE SUBSTRATE FOR FUEL CELL

This is a continuation-in-part application of international application PCT/DE96/02424 filed Dec. 13, 1996 and claiming the priority of German application 195 47 700.6 filed Dec. 20, 1995.

BACKGROUND OF THE INVENTION

The invention relates to an electrode and to a fuel cell stack for a fuel cell with self-supporting properties.

A high temperature fuel cell (SOFC) consists of a fuel cell stack and the associated peripheral equipment. A fuel cell stack includes a plurality of units comprising an electrolyte, a cathode and an anode. The electrolyte consists for example of yttrium-stabilized zirconium dioxide (YSZ) ($ZrO_2$-8 mol % $Y_2O_3$), the cathode consists for example of strontium-doped lanthanum manganese oxide (LSM) ($La_{1-x-y}Sr_xMnO_{3-z}$) and the anode consists for example of a catalytically not effective and a catalytically effective phase (for example Nickel-YSZ Cermet; 40 Vol-% Ni/60-Vol-% YSZ). Interconnector plates connect several anode-electrolyte-cathode units with one another.

From the German patent application No. 195 19 847.6-45, it is known to employ self-supporting electrolyte foils and interconnector plates.

The term self-supporting property means that the foils do not bend if they are lifted at one point. The two electrodes are deposited on the electrolyte foil as layers. The electrolyte foils as well as the interconnector plate must insure the mechanical stability.

It is necessary that the self-supporting electrolyte foil has a thickness of about 200–300 $\mu$m in order to insure the mechanical stability. However, a thick electrolyte layer inhibits the ion transport through the electrolyte which occurs in the fuel cells.

In order to eliminate this disadvantage, the substrate concept has been developed. A porous substrate is prepared from one of the electrode materials and is used as support for the other cell components. It must be made accordingly thick. Requiring a layer thicknesses of more than 0.5 mm, since the porous layer has a much smaller strength than, for example, the electrolyte.

On this substrate, a very thin electrolyte layer is deposited and the second electrode layer is deposited thereon. These three-layer cell units together with the interconnector plates are connected in series to form a stack.

It is a disadvantage of both these concepts that expensive materials such as YSZ, cerium-compounds or lanthanum compounds must be used for the manufacture of the self-supporting components.

It is the object of the invention to provide an electrode and a fuel cell stack by which the disadvantages mentioned are minimized.

SUMMARY OF THE INVENTION

In an electrode for a fuel cell which has a porous self-supporting layer and another layer with catalytic properties disposed on the self-supporting layer, the self-supporting layer has a thickness several times greater than that of the layer with the catalytic properties and consists of a cermet comprising $Al_2O_3$ or $TiO_2$ to which Ni is admixed.

The porous self-supporting layer gives the electrode the self-supporting property. This can be achieved by an appropriately thick layer of, for example, 1 to 3 mm. If a very rigid material is used, the layer may be substantially thinner than 1 mm. However, the self-supporting layer has a thickness which is several times that of the other layer.

The self-supporting layer is preferably mechanically stronger than the other electrode layers or the electrolyte layer. In this way, expensive material can be saved.

The other layer has the electro-catalytic properties required of an electrode in a fuel cell. This means that the fuel gas ($H_2$ or CO) is oxidized electrolytically by a sufficient supply of oxygen ions through the electrolyte layer and a catalyst which is able to adsorb the gaseous species on its surface.

Separating the supporting function from the catalytic function of an electrode makes it possible to use inexpensive materials for obtaining the mechanical rigidity. With the concepts utilized so far, it was necessary to employ expensive materials for this purpose as pointed out earlier.

Alternatively, relatively inexpensive materials for the self supporting component should further fulfill the following criteria for utilization:

- there is no chemical interaction between the interconnector material and the self-supporting component (substrate);
- the combustion gases of different compositions are chemically stable (for example, $CH_4/H_2O$, $C_nH_m/H_2O$, $H_2/H_2O$;
- there is compatibility with the thermo-physical properties (for example, thermal expansion coefficient) of the other fuel cell components;
- there is a porosity for sufficient permeation of fuel gas and reaction products;
- there is an electric conductivity for bridging the electron transport between the catalytically active anode layer and the interconnector.

These criteria are fulfilled particularly well by cermets consisting of Ni and $Al_2O_3$, or respectively, Ni and $TiO_2$. Suitable commercially available and inexpensive oxides are further: $Cr_2O_3$, $Fe_2O_3$, and depleted $UO_2$.

The chemical properties of $Al_2O_3$ and $TiO_2$ insure a sufficient long-term stability. Interactions with the YSZ of the catalytically active layer are not known ($Al_2O_3$) or not detrimental ($TiO_2$). The thermal expansion coefficients of $Al_2O_3$ and $TiO_2$ ($8.3\times10^{-6}$ $K^{-1}$ and $9.1\times10^{-6}$ $K^{-1}$ respectively) as well as the intermediatey forming compounds $NiAl_2O_4$ or $NiTiO_3$ ($8.1\times10^{-6}$ $K^{-1}$ and $1a4\times10^{-6}$ $K^{-1}$, respectively) are smaller than those of YSZ ($10.8\times10^{-6}$ $K^{-1}$) or a metallic interconnector ($CrFe5Y_2O_31:11.3\times10^{-6}$ $K^{-1}$). By suitable admixtures of Ni, the thermal expansion coefficient can be adapted to the other fuel cell components.

For example, the thermal expansion coefficients are for:

$Al_2O_3$+67.8 Vol-% NiO; $10.49\times10^{-6}$ $K^{-1}$ $Al_2O_3$+60 Vol-% Ni: $10.06\times10^{-6}$ $K^{-1}$ $TiO_2$+59.3 Vol-% NiO: $11.37\times10^{-6}$ $K^{-1}$ $TiO_2$+50 Vol-% Ni: $12.04\times10^{-6}$ $K^{-1}$ By an increased admixture of NiO and a subsequent reduction to Ni a good electric conductivity is achieved.

By locating gas channels within the mechanically stabilizing electrode layer, the gas can be supplied to the catalytically active layer by a shorter path as compared to the prior substrate concept.

DESCRIPTION OF A PREFERRED EMBODIMENT

Figure 1:
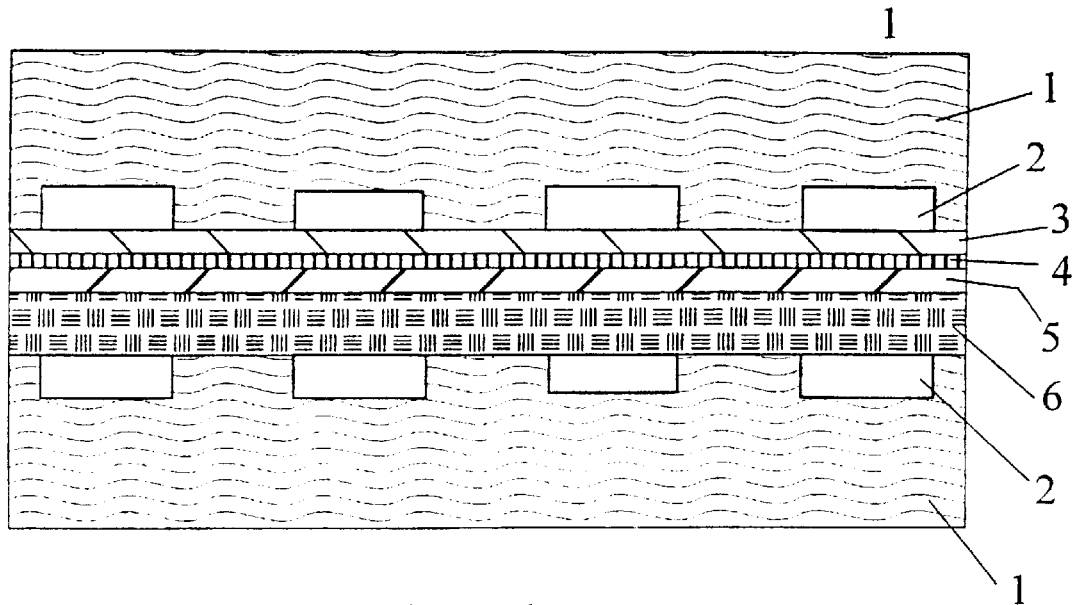
FIG. 1 shows a fuel cell unit with an electrode.

FIG. 1 shows a unit including interconnectors 1, gas channels 2, a cathode 3, an electrolyte 4, and anodes 5 and 6, which unit is designed for use in high temperature fuel cells.

Figure 2:
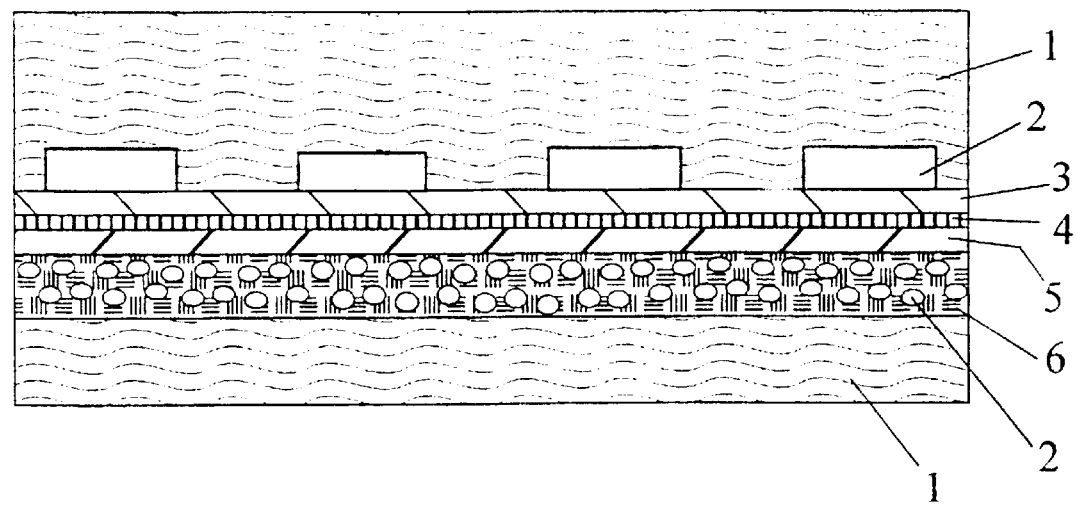
FIG. 2 shows a fuel cell unit with gas passages in the electrode.

As shown in FIGS. 1 and 2, the support function is separated spatially from the catalytic function. The support layer and the catalytically active layer are manufactured by common methods: an Ni/$Al_2O_3$ or an Ni/$TiO_2$—cermet 6 is manufactured by tape casting and, if appropriate, lamination of several cast foils or by a coat-mix process; the catalytically active layer 5 is manufactured by screen printing or wet powder spray deposition.

By placing the gas channels 2 instead of in the interconnector 1 (FIG. 1) into the interior of the support layer 6 (FIG. 2) substantially more fuel gas reaches the catalytically active anode layer 5 and the fuel utilization is increased. The gas passages 2 can be formed during the manufacture of the support layer 6 by utilizing, for example, carbon fibers or pre-manufactured hard polymer dies. With the Coat-Mix-process as well as with the tape casting these expanded organic additives consisting of C, H, O and possibly N can be included into the unfinished body. The body is then pre-sintered in a heat treatment process in order to obtain form stability and then finally sintered an air whereby the fibers and the organic additives are burnt out and a channel structure remains in the now porous substrate.

In this way, planar fuel cell components can be assembled and not only the interconnection of the anode and the interconnector is facilitated, but substantial savings of the expensive interconnector material are achieved.

What is claimed is:

1. An electrode for a fuel cell having two layers, one of said layers being porous and self-supporting, the other of said layers having electro-catalytic properties, the layer thickness of the self-supporting layer being multiple times greater than the thickness of the other layer, and said self-supporting layer consisting of a cermet comprising one of $Al_2O_3$ and $TiO_2$, and Ni admixed thereto.

2. An electrode according to claim 1, wherein said self-supporting layer is porous.

3. An electrode according to claim 1, wherein gas channels for the supply of gas to said layer with catalytic properties are provided in said thicker layer.

4. An electrode cell stack comprising electrodes, each having two layers, one of said layers being porous and self-supporting, the other of said layers having catalytic properties, the layer thickness of the self-supporting layer being multiple times greater than the thickness of the other layer, and said self-supporting layer consisting of a cermet comprising one of $Al_2O_3$ and $TiO_2$, and Ni admixed thereto.

* * * * *